(12) United States Patent
Hoher et al.

(10) Patent No.: US 7,828,096 B2
(45) Date of Patent: Nov. 9, 2010

(54) HYBRID DRIVE FOR A VEHICLE

(75) Inventors: Markus Hoher, Tettnang (DE); Linus Eschenbeck, Wangen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 439 days.

(21) Appl. No.: 11/777,446

(22) Filed: Jul. 13, 2007

(65) Prior Publication Data
US 2008/0011529 A1    Jan. 17, 2008

(30) Foreign Application Priority Data
Jul. 14, 2006    (DE) .................. 10 2006 033 087

(51) Int. Cl.
*B60K 6/365*    (2007.10)
(52) U.S. Cl. ................ 180/65.6; 903/910; 903/912; 475/5; 475/275
(58) Field of Classification Search ............. 180/65.21, 180/65.31, 65.6, 65.7; 903/909, 910, 911, 903/912, 915, 917, 951; 475/5, 271, 275, 475/278, 282, 284, 286, 288, 290
See application file for complete search history.

(56) References Cited

U.S. PATENT DOCUMENTS

| 4,407,398 | A | * | 10/1983 | Fiala | 477/5 |
|---|---|---|---|---|---|
| 5,823,282 | A | * | 10/1998 | Yamaguchi | 180/65.235 |
| 6,024,667 | A | * | 2/2000 | Krohm et al. | 477/6 |
| 6,705,416 | B1 | * | 3/2004 | Glonner et al. | 180/65.23 |
| 7,244,208 | B2 | * | 7/2007 | Bauknecht et al. | 475/5 |
| 7,645,207 | B2 | * | 1/2010 | Kamm et al. | 475/275 |
| 2005/0079942 | A1 | | 4/2005 | Bauknecht et al. | |
| 2008/0234093 | A1 | * | 9/2008 | Diosi et al. | 475/276 |
| 2008/0269004 | A1 | * | 10/2008 | Diosi et al. | 475/276 |

FOREIGN PATENT DOCUMENTS

| DE | 19917665 | 10/2000 |
|---|---|---|
| DE | 10346640 | 5/2005 |
| DE | 102005002337 | 8/2006 |

* cited by examiner

*Primary Examiner*—S. Joseph Morano
*Assistant Examiner*—John D. Walters
(74) *Attorney, Agent, or Firm*—Davis & Bujold, P.L.L.C.

(57) ABSTRACT

The invention proposes a hybrid drive for a vehicle with a power train, which has a first electric machine (4), which is permanently connected to an input shaft (3) of the vehicle transmission (2) arranged between an internal combustion engine (1) and a vehicle transmission (2) with changeable gear ratio, and which can be operated as an engine or as a generator, and a hydraulic pump (5) for the vehicle transmission (2), in which at least one first shiftable clutch device (7) is arranged between the internal combustion engine (1) and the vehicle transmission (2), and in which the hydraulic pump (5) is torque-proof connected to the input shaft (3) of the vehicle transmission (2). A hybrid drive is also proposed, which comprises two electric machines, in which the hydraulic pump (5) is coupled via at least one element for force transfer to the input shaft (3) of the vehicle transmission (2).

11 Claims, 3 Drawing Sheets

HYBRID DRIVE FOR A VEHICLE

This application claims priority from German Application Serial No. 10 2006 033 087.0 filed Jul. 14, 2007.

FIELD OF THE INVENTION

The invention concerns a hybrid drive for a vehicle.

BACKGROUND OF THE INVENTION

From the publication DE 199 17 665 A1 a hybrid drive for a motor vehicle is known. The known hybrid drive forms a power train, which has a first electric machine and a second electric machine connected directly and permanently to an input shaft of the vehicle transmission between an internal combustion engine of the motor vehicle and a vehicle transmission. Between the electric machines, which can be operated respectively as an engine and a generator, and the internal combustion engine is respectively arranged a shiftable clutch. Furthermore, a hydraulic pump that builds up the oil pressure is provided in order to make available a required oil pressure for controlling and adjusting the vehicle transmission. The hydraulic pump is connected, on the one hand, directly to the first electric machine and, on the other hand, to an intermediate shaft arranged between the two clutches. The hydraulic pump is electrically driven with the first electric machine or mechanically driven with the internal combustion engine via the first engaged clutch.

In the known hybrid drive a considerably large installation space is required, because of the arrangement of the two electric machines, the hydraulic pump, as well as the input shaft of the vehicle transmission.

SUMMARY OF THE INVENTION

Accordingly, it is an object of the invention to improve a hybrid drive for a vehicle in such a way that the hybrid drive requires less installation space and is thus more economic to produce.

This object is attained with the invention, for example, by means of a hybrid drive for a vehicle with a power train, which has an electric machine, that is permanently connected to an input shaft of the vehicle transmission and can be operated as an engine and a generator, and a hydraulic pump for the vehicle transmission located between an internal combustion engine and a vehicle transmission with changeable gear ratio. At least one first shiftable clutch is arranged between the internal combustion engine and the vehicle transmission and the hydraulic pump is connected in a rotationally fixed manner to the input shaft of the vehicle transmission.

A hybrid drive is thus realized only with one electric machine, since the hydraulic pump is directly connected to the input shaft of the vehicle drive and thus does not require a separate drive. This makes a space saving arrangement of the hybrid drive possible and reduces the production costs.

For the procedure of starting, the electric machine can first be adjusted to a specific rotational speed, with which sufficient oil pressure for engaging, for example, the first clutch can be built up by means of the drive of the hydraulic pump connected thereto. As soon as the first clutch is engaged, the hydraulic pump can be driven further via the internal combustion engine. The starting procedure takes place thus in the standard case via the electric machine, wherein a second clutch is used as startup clutch after the first clutch.

In special driving conditions, such as, for example, when the vehicle creeps uphill, it is possible that the stored electric energy is no longer sufficient for further driving the vehicle when the electric machines are solely used. In this case, the internal combustion engine can be started at the right time, so that the internal combustion engine serves as primary driving source without further provisions.

The object of the invention is also attained by means of a hybrid drive, in which, aside from the clutch, a torque converter connected to the hydraulic pump, is arranged between the internal combustion engine and the vehicle transmission. The hydraulic pump can thus be driven by way of the torque converter. In this embodiment variation, a crankshaft starter generator can preferably be arranged in the power train.

The object of the invention can also be attained by a hybrid drive, in which the hydraulic pump is connected in a rotationally fixed manner to a second electric machine. The hydraulic pump is coupled to the input shaft of the vehicle transmission to transfer force via at least one element. A free-wheel clutch or the like can preferably be provided as element for force transfer. However, other elements, such as, for example, chains or the like, can also be used, which allow any arrangement type, so that the hydraulic pump is not required to be coaxially arranged with respect to the input shaft of the vehicle transmission.

When a free-wheel clutch is used, it is also possible to connect the free-wheel clutch to the shaft of the hydraulic pump. The free-wheel clutch can also be arranged coaxially with regard to the input shaft of the vehicle transmission.

In this proposed embodiment variation, the required oil pressure for controlling and adjusting the vehicle transmission can be advantageously generated by means of the second electric machine, which has, for example, a smaller design. In this way, the oil pump of the vehicle transmission can be made available ahead of time when the vehicle is electrically started. As soon as the internal combustion engine is started or the rotational speed of the first electric machine is greater than that of the second smaller electric machine, the second electric machine can be deactivated, since the hydraulic pump can be driven, via the engaged free-wheel clutch, by either the internal combustion engine or by the first electric machine.

Within the scope of an advantageous embodiment of the invention, the hydraulic pump and the second electric machine are arranged coaxially with regard to the input shaft of the vehicle transmission or also axially parallel or the like. The constructive arrangement of the hydraulic pump and the second electric machine can be adapted to the respectively available mechanical connection.

With specific applications having precise specifications with regard to the utilized oil pressure for the vehicle transmission, it can be advantageous, according to a further development of the invention, to arrange a suitable gear ratio between the input shaft of the vehicle transmission and the pump shaft of the hydraulic pump. The respectively used gear ratio can be selected in accordance with the design specifications.

In particular, the embodiment variation of the invention in which two electric machines are provided, it is conceivable to integrate the second electric machine to drive in the hydraulic pump. In this way, the hydraulic pump and the second electric machine can be combined as one joint component, which is economic and space saving, for the proposed hybrid drive.

Independent from the proposed solution, the hybrid drive of the invention can comprise instead or in addition an electrically driven hydraulic pump for the vehicle transmission. This variation can be preferably used in a hybrid drive in which only one electric machine is provided.

Especially in the proposed hybrid drive with two electric machines, it turns out to be advantageous that the required oil pressure for the vehicle transmission can already be measured before driving off, by means of the second electric machine. Different starting combinations are conceivable with this variation. For example, the starting procedure can be carried out via the first electric machine. In the case in which starting is to be carried out via the internal combustion engine, for example, when the battery charge is low, the internal combustion engine can be started with the first electric machine by engaging the first clutch. As startup clutch serves in this case the second clutch, which is correspondingly designed.

A so-called boost operation is also possible, in which, for example, the accelerator pedal is strongly depressed, the driving force of the internal combustion engine can be added to the drive force of the first electric machine, via the first shiftable clutch, in order to achieve the maximum acceleration.

The following other embodiments of the invention can be combined in any desired way with the proposed embodiment variations of the hybrid drive, independently thereof if now an electric machine or also two electric machines are used with the hybrid drive.

In order to reduce vibration that may be transferred by the internal combustion engine, a torsional vibration damper can be arranged in the power train between the internal combustion engine and the vehicle transmission. As a torsional vibration damper, for example, a dual mass flywheel with a first mass as primary mass and a second mass as secondary mass, can be used but also any other suitable damping element is possible. The torsional vibration damper can be connected indirectly, but also directly, via a so-called drive plate, to the crankshaft of the internal combustion engine in the proposed hybrid drive.

In a following advantageous further development of the invention, it can be provided that the installation position of the output shaft in the vehicle is transversal to the vehicle transmission. In this type of arrangement, the output shaft can be arranged between the torsional vibration damper and the internal combustion engine. It is also possible to arrange the output shaft between the torsional vibration damper and the vehicle transmission. In particular when a dual mass flywheel is used as torsional vibration damper, according to another variation, the primary mass of the dual mass flywheel can be arranged between the internal combustion engine and the output shaft, which is transversely arranged with regard to the input shaft of the vehicle transmission, while the secondary mass of the dual mass flywheel is arranged between the output shaft and the vehicle transmission. Other arrangement possibilities are also conceivable in order to optimize utilization of installation space in the vehicle.

A further particularly advantageous embodiment of the invention can provide that the proposed hybrid drive has as vehicle transmission, an automatically shifting variable speed vehicle transmission with planetary design having at least eight forward gears and at least one reverse gear.

As a vehicle transmission an automatically shifting 8-gear transmission is preferably used and comprises, aside from the input shaft and output shaft, at least four planetary gear sets, at least eight rotary shafts, as well as at least five shifting elements, whose selective engagement produces different gear ratios between the input shaft and the output shaft, so that eight forward gears and at least one reverse gear can be realized.

In this connection, it should be noted that this application incorporates by reference the entire content of the parent application DE 10 2005 002 337.1 of the applicant.

In particular a clutch or brake of the vehicle transmission can be used as second clutch device. Installation space is saved in this way, especially in the axial direction, since one of the clutches of the serially arranged hybrid drive is omitted, because the function of this second clutch device is assumed by the already existing clutch or brake of the automatic transmission.

In all the described embodiment variations, it is also conceivable to utilize the first clutch device for the startup and the latter is thus designed as a starting clutch. The clutch device integrated in the transmission then does not have to be used in the frictional starting procedure. It is advantageous that no additional cooling devices are necessary in the automatic transmission. The first clutch device, which is anyway also necessary for the hybrid function, is designed in this case in such a way that a sufficient cooling power is available.

Independently from the respective embodiment variations, the clutch devices can normally be engaged or also normally disengaged clutches. Dry or wet single disk or multiple disk clutches can be used. So-called HCC clutches, for example, can also be used.

BRIEF DESCRIPTION OF THE DRAWINGS

The invention will be explained in more detail in the following with reference to the corresponding drawings. The same components are identified with the same reference numerals in the figures. In the figures.

DETAILED DESCRIPTION OF THE INVENTION

Figure 1:
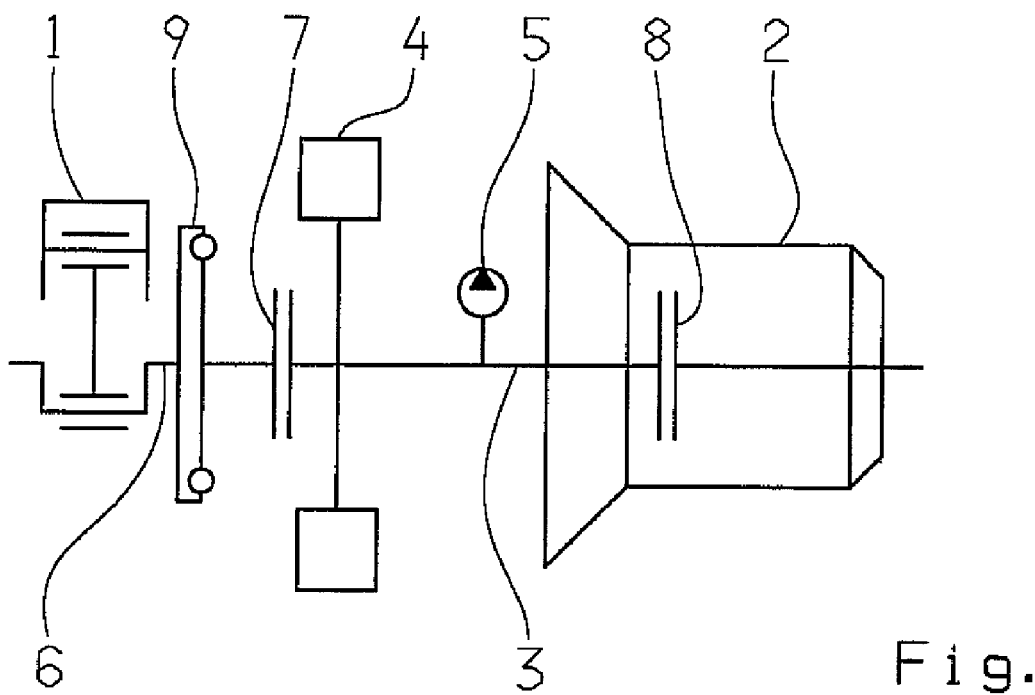
FIG. 1 shows a schematic view of a first possible embodiment of a hybrid drive for a vehicle.

FIGS. 1 to 4 represent different exemplary embodiments of a hybrid drive. In all the exemplary embodiments, the hybrid drive for a motor vehicle comprises a power train, in which a first electric machine 4, is permanently connected to an input shaft 3 of the vehicle transmission 2 is arranged between an internal combustion engine 1 and a vehicle transmission 2 with a changeable gear ratio. The first electric machine 4 can be operated as an engine for driving the motor vehicle and as a generator for charging the batteries. A hydraulic pump 5 is provided, in addition, for the vehicle transmission 2. The crankshaft 6 of the internal combustion engine 1 is connected, via a first clutch device 7, to the input shaft 3 of the vehicle transmission 2, so that the internal combustion engine 1 is separated from the input shaft 3 of the vehicle transmission 2 when the clutch device 7 is disengaged. In addition, a second clutch device 8 is provided on the input shaft 3, and is a clutch or brake of the vehicle transmission 2.

Figure 3:
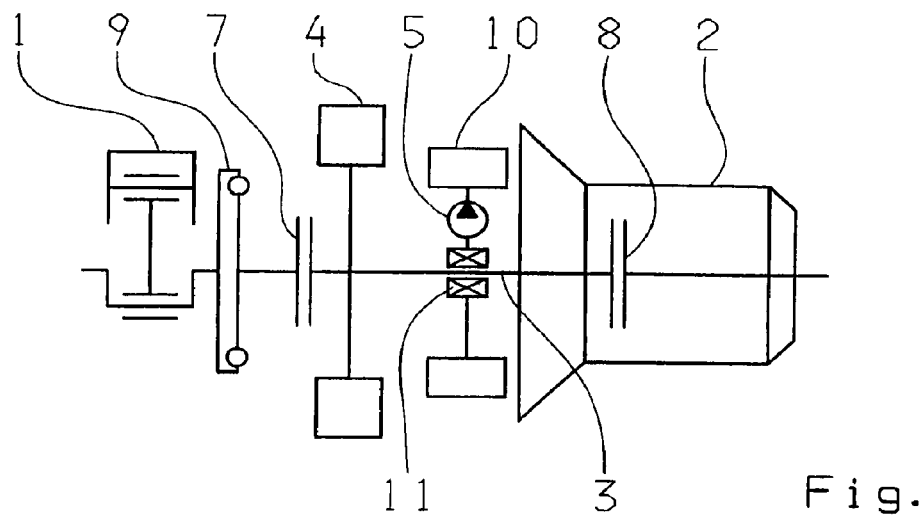
FIG. 3 shows a schematic view of a third exemplary embodiment of the hybrid drive for a motor vehicle.
Figure 4:
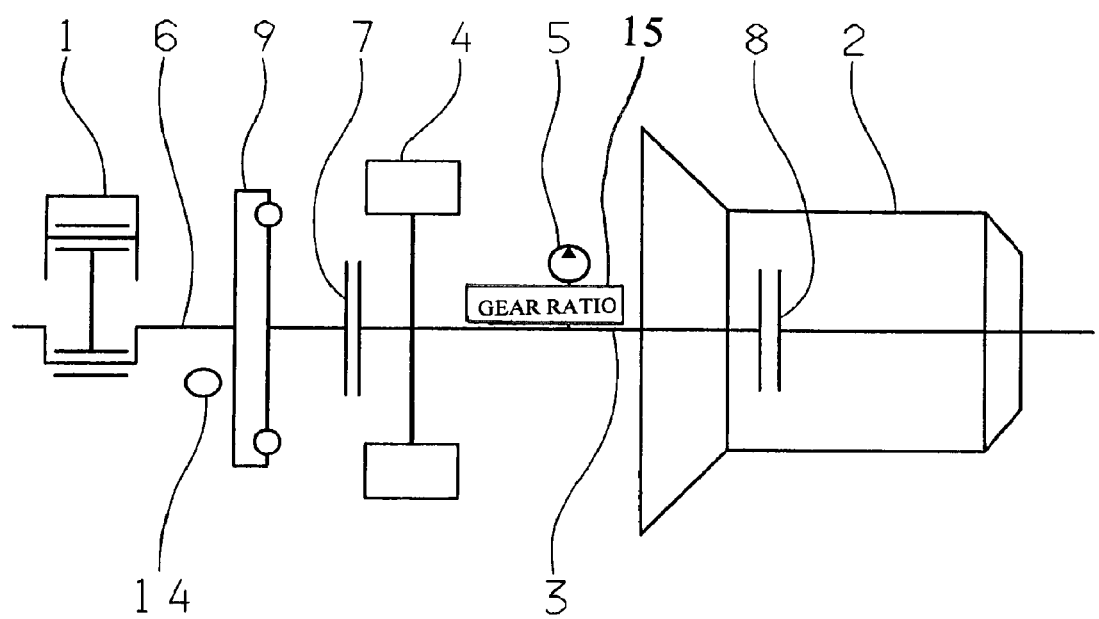
FIG. 4 shows a schematic view of a variation of the first exemplary embodiment according to FIG. 1.

In the exemplary embodiments according to FIGS. 1, 3 and 4, a torsional vibration damper is arranged between the internal combustion engine 1 and the first clutch device 7 as dual mass flywheel 9 for damping vibration at the crankshaft 6.

In the first exemplary embodiment of the hybrid drive represented in FIG. 1, the hydraulic pump 5, for generating the required oil pressure, controlling and adjusting the vehicle transmission 2, is fixedly connected to the input shaft 3 of the vehicle transmission 2 and thus also to the first electric machine 4.

For a starting procedure with the hybrid drive shown herein, first the first electric machine 4 is brought to a rotational speed at which sufficient oil pressure is generated by the hydraulic pump 5 to engage the first clutch device 7 or the second clutch device 8 for driving the vehicle transmission 2. The starting procedure takes place then in the standard case, via the first electric machine 4, wherein the second clutch device in the vehicle transmission 2 must slip with each starting procedure. In this way, a thermally more robust design of the second clutch device 8 is required, unless the first clutch device 7 is designed as a startup clutch.

For example, when the vehicle creeps uphill, it can happen that when the first electric machine 4 is solely used, the stored electric energy is no longer sufficient to make any further driving possible. In this case, the internal combustion engine 1 can be started before the energy stores of the internal combustion engine 1 are entirely emptied.

Figure 2:
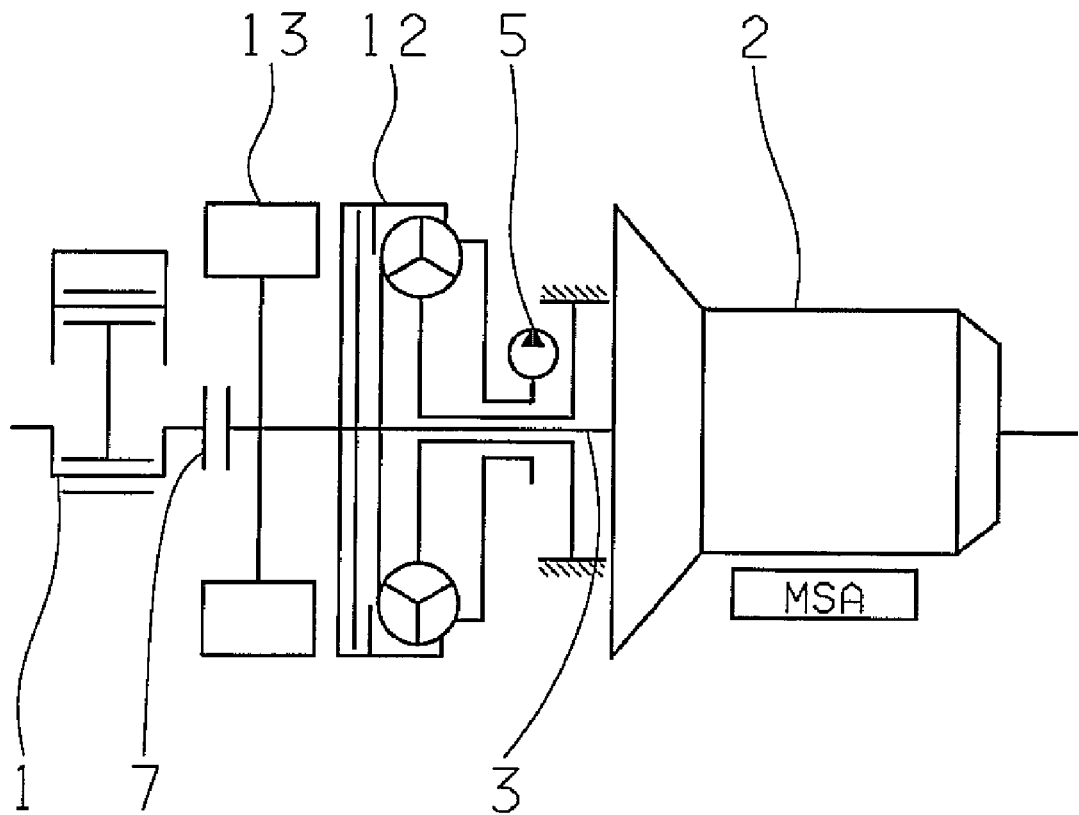
FIG. 2 shows a schematic view of a second embodiment of the hybrid drive for a vehicle.

A second exemplary embodiment is shown in FIG. 2. In this exemplary embodiment, the hydraulic pump 5 is connected to a torque converter 12. In this way, the hydraulic pump 5 is driven by means of the torque converter 12, which is connected to the input shaft 3 of the vehicle transmission 2. In contrast with the other exemplary embodiments, the electric machine is designed herein as a crankshaft starter generator 13. In addition, an electric hydraulic pump MSA can be arranged on the vehicle transmission 2 to ensure a faster or continuous supply of oil.

In FIG. 3 is shown a third exemplary embodiment of the hybrid drive. In this embodiment, the required oil pressure for the electric startup is generated by means of a smaller second electric machine 10. The second electric machine 10 is connected in a rotationally fixed manner to the hydraulic pump 5 of the vehicle transmission 2. The hydraulic pump 5 is connected, in turn, via a free-wheel clutch 11, to the input shaft 3 of the vehicle transmission 2.

In this way, the hydraulic pump 5 can be driven, via the second electric machine 10, during an electric startup. As soon as the internal combustion engine 1 is activated or the rotational speed of the first electric machine 4 is greater than the rotational speed of the second electric machine 10, the second electric machine 10 can be deactivated. This is possible because the hydraulic pump 5 is driven, via the engaged free-wheel clutch 11 by the internal combustion engine 1 or the first electric machine 4.

In this exemplary embodiment, it is advantageous that the oil pressure sufficient for controlling and adjusting the vehicle transmission 2 is built up before driving the vehicle by means of the second electric machine 10. In this starting arrangement, the internal clutch or brake of the vehicle transmission 2 is engaged. The starting procedure is carried out exclusively via the first electric machine 4. If the energy supply of the first electric machine 4 is insufficient, the vehicle is started, via the internal combustion engine 1, which is started with the first electric machine 4 by engaging the first clutch device 7. With very strong accelerations, the driving force of the internal combustion engine 1 and the first electric machine 4, are combined, via the first clutch device 7.

In FIG. 4 is shown a variation of the first exemplary embodiment of the hybrid drive, which provides another installation position of the hybrid drive in contrast with the first exemplary embodiment according to FIG. 1. In this variation, the output shaft 14 is transverse to the input shaft 3 of the vehicle transmission 2. The output shaft 14 is arranged between the internal combustion engine 1 and the dual mass flywheel 9 and a gear ratio 15 is arranged between the input shaft 3 of the vehicle transmission 2 and the pump shaft of the hydraulic pump 5.

Figure 5:
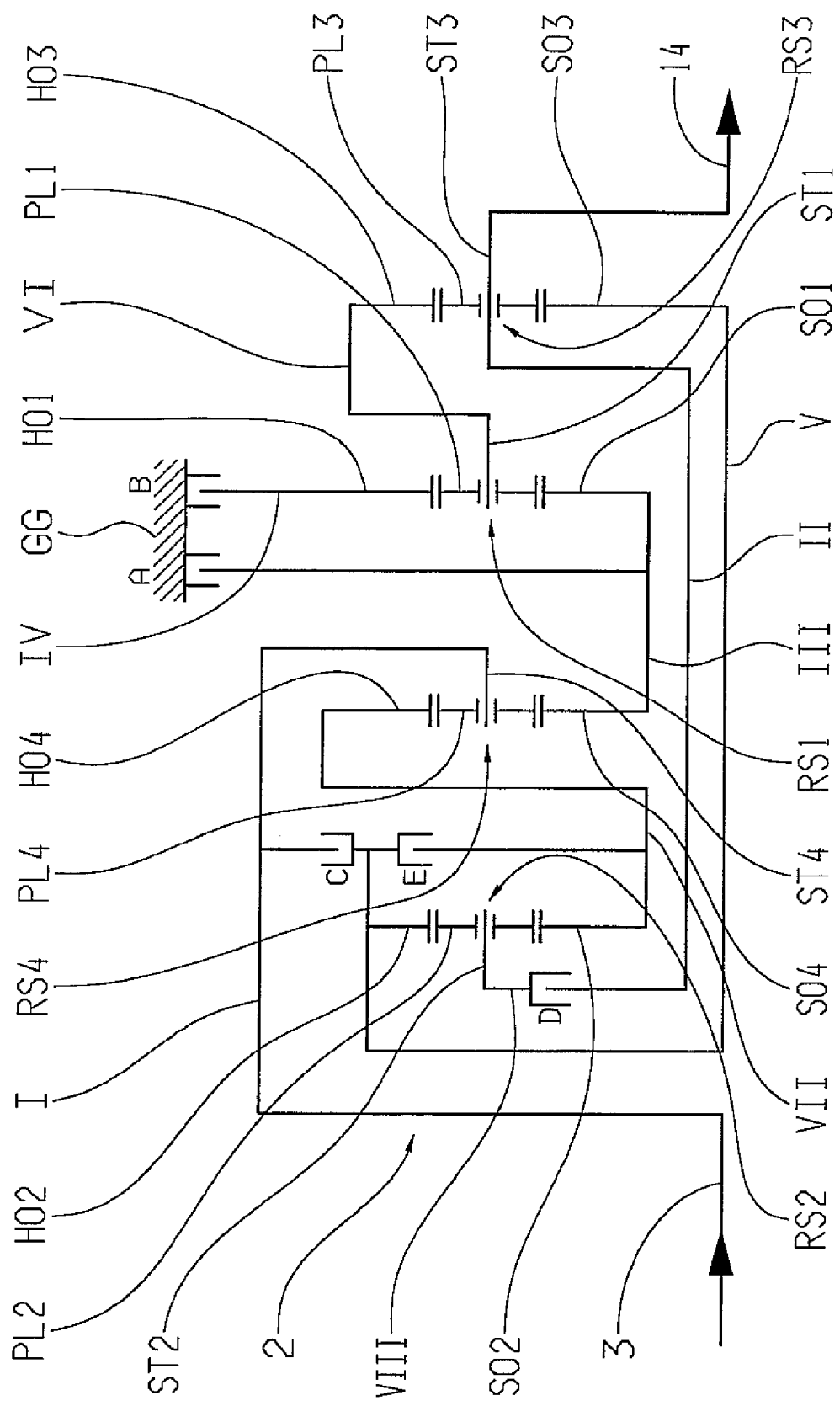
FIG. 5 shows a schematic view of a possible exemplary embodiment of a planetary gear set arrangement of an 8-gear automatic transmission.

In FIG. 5 is a possible exemplary embodiment of an 8-gear vehicle transmission 2, which is arranged in the power train of the hybrid drive according to the invention. The vehicle transmission 2 comprises the input shaft 3 and an output shaft 14, as well as four planetary gear sets RS1, RS2, RS3, RS4 and five shifting elements A, B, C, D, E, which are all arranged in a housing GG of the transmission. All four planetary gear sets RS1, RS2, RS3, RS4 are configured as simple negative planetary gearsets and are arranged coaxially one behind the other in this exemplary embodiment in axial direction in the sequence RS2, RS4, RS1, RS3. A negative planetary gearset is known to have planetary gears, which mesh with the sun gear and the ring gear of this planetary gearset. The ring gears of the four planetary gearsets RS1, RS2, RS3, RS4 are identified with the reference characters HO1, HO2, HO3, HO4, the sun gears are identified with the reference characters S01, S02, S03, S04, the planetary gears are identified with reference characters PL1, PL2, PL3, PL4, and the spiders, on which the mentioned planetary gearsets are rotatably mounted, are identified with reference characters ST1, ST2, ST3 and ST4. The shifting elements A and B are configured as brakes, which can both be configured in the shown exemplary embodiment as non-positive shiftable disk brakes, which in another embodiment can also be configured as positive shiftable claw or cone brakes. The shifting elements C, D and E are configured as clutches, which in the shown exemplary embodiment are configured as non-positive shiftable disk clutches, which can also be configured in another embodiment, for example, as positive shiftable claw or cone clutches.

By selective shifting of these five shifting elements A to E eight forward gears and at least one reverse gear can be realized. This vehicle transmission 2, which has been selected, for example, for the hybrid drive according to the invention, has a total of at least eight rotary shafts, which are identified with roman numerals I to VIII.

The following is provided in the multiple levels of the vehicle transmission 2 according to FIG. 5 with regard to the coupling of the individual elements of the four planetary gearsets RS1, RS2, RS3, RS4 among each other and to the input and output shafts 3, 14. The carrier ST4 of the fourth planetary gearset RS4 and the input shaft 3 are connected in a rotationally fixed manner to each other and form the first shaft I of the transmission 2. The carrier ST3 of the third planetary gearset RS3 and the output shaft 14 are connected in a rotationally fixed manner to each other and form the second shaft II of the transmission 2. The sun gear S01 of the first planetary gearset RS1 and the sun gear S04 of the fourth planetary gearset RS4 are connected in a rotationally fixed manner to each other and form the third shaft III of the transmission 2. The ring gear HO2 of the first planetary gearset RS1 forms the fourth shaft IV of the transmission 2. The ring gear HO2 of the second planetary gearset RS2 and the sun gear S03 of the third planetary gearset RS3 are connected in a rotationally fixed manner to each other and form the fifth shaft V of the transmission 2. The carrier ST1 of the first planetary gearset RS1 and the ring gear HO3 of the third planetary set RS3 are connected in a rotationally fixed manner to each other and form the sixth shaft VI of the transmission 2. The sun gear S02 of the second planetary gearset RS2 and the ring gear HO4 of the fourth planetary gearset RS4 are connected in a rotationally fixed manner to each other and form the seventh shaft VII of the transmission 2. The carrier ST2 of the second planetary gearset RS2 forms the eight shaft VIII of the transmission 2.

The following is provided with regard to the coupling of the five shifting elements A to E to the shafts I to VIII thus described according to FIG. 5. The first shifting element A is arranged in the power flow between the third shaft III and the transmission housing GG. The second shifting element B is arranged in the power flow between the fourth shaft IV and the transmission housing GG. The third shifting element C is arranged in the power flow between the fifth shaft V and the first shaft I. The fourth shifting element D is arranged in the power flow between the eighth shaft VIII and the second shaft II. The fifth shifting element E is finally arranged in the power flow between the seventh shaft VII and the fifth shaft V.

In the vehicle transmission 2 for the proposed hybrid drive shown in FIG. 5, the second planetary gearset RS2 is the gearset closest to the input of the vehicle transmission 2 and the third planetary gearset RS3 is the gearset closest to the output of the vehicle transmission 2, wherein the input shaft 3 and the output shaft 14 are arranged, for example, coaxially with respect to each other.

It is likewise possible to not arrange the input shaft 3 and the output shaft 14 coaxially with respect to each other, but to provide them, for example, axially parallel or at an angle with respect to each other. In an arrangement such as this, the input of the transmission can be also arranged, if required, close to the third planetary gearset RS3, that is, on the side of the third planetary gearset RS3 that faces away from the first planetary gearset RS1.

According to the spatial arrangement of the four gearsets in the sequence "RS2, RS4, RS1, RS3" (seen in axial direction), the second shaft II of the transmission 2 extends consequently by sections centrally within the third shaft III and by sections centrally within the seventh shaft VII. Therein, the fifth shaft V extends, on the one hand, by sections centrally within this second shaft II and, on the other hand, a section of the fifth shaft V completely encloses the clutch D and the second planetary gearset RS2 in axial and radial direction. The first shaft I of the vehicle transmission 2 completely overlaps the second and fourth planetary gearsets RS2, RS4 as well as the clutches D, C, E in axial and radial direction. The clutches D, C, E are thus arranged within a cylindrical space formed by the shaft I.

As can also be seen in FIG. 5, the two brakes A, B in the shown exemplary embodiment are arranged axially directly side by side from a spatial point of view in an area radially above the planetary gearsets RS1 and RS4, wherein the brake B is at least partially radially over the first planetary gearset RS1, and wherein the brake A is axially arranged at least partially in an area between the two planetary gearsets RS4 and RS1. The kinematic connection of the two brakes A, B to the two planetary gearsets RS4 and RS1 requires that the brake B be arranged closer to the third planetary gearset RS3 or closer to the output of the transmission 2 than the brake A. This spatial arrangement of the two brakes A, B in FIG. 5 is only an example. The brake A can also be arranged, for example, at least partially radially over the fourth planetary gearset RS4. Depending on the installation space that is available for the transmission housing GG in the vehicle, the two brakes A, B (based on the depiction of FIG. 5) can be arranged, for example, axially offset in an area radially over the planetary gearsets RS2 and RS4 or radially over the planetary gearsets RS3 and RS1 or axially completely between the planetary gearsets RS4 and RS1 in another embodiment. Depending on the installation space that is available, the brake A can also be arranged, for example, within a cylindrical space formed by the brake B.

As can also be seen in FIG. 5, the two clutches C and E are arranged essentially one over the other seen from a radial point of view and between the second planetary gearset RS2 and the fourth planetary gearset RS4 seen from an axial point of view, wherein the disk set of the clutch C is arranged at least predominantly radially over the disk set of the clutch E. A common lamella carrier, which is configured, for example, as an inner disk carrier for the radially outer disk set of the clutch C and as outer disk carrier for the radially inner disk set of the clutch E, can be suitably provided for both clutches C, E. In order to achieve a simplification of the servo unit of the two clutches C, E, which are not shown, these can be combined with the mentioned common disk sets and the two mentioned lamella packets to form a preassemblable module, so that both servo units rotate then constantly with the rotational speed of the ring gear HO2 of the second planetary gearset RS2. Both servo units can have a dynamic pressure equalization to compensate for the rotary pressure of their rotating pressure chambers. For example, the servo unit of the clutch C can, however, be separately axially movably mounted on the disk carrier that is common for the two clutches C, E and the servo unit of the clutch E can also be separately axially movably mounted on the input shaft 3, so that it rotates constantly with the input rotational speed of the transmission 2.

FIG. 5 also shows that the clutch D is arranged axially directly adjacent to the second planetary gearset RS2 on the side of the second planetary gearset RS2 that faces away from the fourth planetary gearset RS4 seen from a spatial point of view. In the shown example, the disk set of the clutch D has a comparatively small diameter corresponding to the kinematic connection of the clutch D to the carrier ST2 of the second planetary gearset RS2. It is also possible that the clutch D can also have a greater diameter by means of a simple reconfiguration in another embodiment of the transmission 2, for example, axially beside the ring gear HO2 of the second planetary gearset RS2 or also axially between the first and third planetary gearsets RS1, RS3. A servo unit of the clutch D, which is not shown for reasons of simplification, can be arranged in such a way that it constantly rotates with the rotational speed of the carrier ST2 of the second planetary gearset RS2 or with the rotational speed of the carrier ST3 of the third planetary gearset RS3. If possible, also the servo unit of the clutch D can also have a dynamic pressure equalization to compensate for the rotary pressure of its rotating pressure chamber.

REFERENCE CHARACTERS

1 Internal combustion engine
2 Vehicle transmission
3 Input shaft of vehicle transmission
4 Electric machine
5 Hydraulic pump
6 Crankshaft
7 First clutch device
8 Second clutch device
9 Dual mass flywheel
10 Second electric machine
11 Free-wheel clutch
12 Torque converter
13 Crankshaft starter generator
14 Output shaft
MSA Electric hydraulic pump
I First shaft
II Second shaft
III Third shaft
IV Fourth shaft
V Fifth shaft
VI Sixth shaft
VII Seventh shaft
VIII Eighth shaft
A First shifting element B Second shifting element
C Third shifting element
D Fourth shifting element
E Fifth shifting element
GG Housing for the vehicle transmission
RS1 First planetary gearset
HO1 Ring gear of the first planetary gearset
SO1 Sun gear of the first planetary gearset
ST1 Carrier of the first planetary gearset
PL1 Planetary gears of the first planetary gearset
RS2 Second planetary gearset
HO2 Ring gear of the second planetary gearset
SO2 Sun gear of the second planetary gearset
ST2 Carrier of the second planetary gearset
PL2 Planetary gears of the second planetary gearset
RS3 Third planetary gearset
HO3 Ring gear of the third planetary gearset
SO3 Sun gear of the third planetary gearset
ST3 Carrier of the third planetary gearset
PL3 Planetary gears of the third planetary gearset
RS4 Fourth planetary gearset
HO4 Ring gear of the fourth planetary gearset
SO4 Sun gear of the fourth planetary gearset
ST4 Carrier of the fourth planetary gearset
PL4 Planetary gears of the fourth planetary gearset

The invention claimed is:

1. A hybrid drive for a vehicle with a power train, the hybrid drive comprising:
   an electric machine (4) permanently connected to an input shaft (3) of a vehicle transmission (2), between an internal combustion engine (1) and the vehicle transmission (2), the vehicle transmission (2) having a changeable gear ratio, and the electric machine being operable as one of a motor and a generator;
   a hydraulic pump (5) for the vehicle transmission (2), the hydraulic pump (5) being connected to the input shaft (3) of the vehicle transmission (2) in a rotationally fixed manner;
   at least one first shiftable clutch device (7); and
   the automatically shifting variable speed transmission (2) comprises:
      an input shaft (3) and an output shaft (14);
      at least first, second, third and fourth planetary gearsets (RS1, RS2, RS3, RS4), each of the first planetary gearset (RS1), the second planetary gearset (RS2), the third planetary gearset (RS3), and the fourth planetary gearset (RS4) having a sun gear, a carrier and a ring gear;
      at least first, second, third, fourth, fifth, sixth, seventh and eighth rotary shafts (I, II, III, IV, V, VI, VII, VIII);
      at least first, second, third, fourth and fifth shifting elements (A, B, C, D, E) whose selective engagement produces different gear ratios between the input shaft (3) and the output shaft (14) such that eight forward gears and at least one reverse gear can be implemented;
      the carrier (ST4) of the fourth planetary gearset (RS4) is coupled to the input shaft (3) to form the first shaft (I);
      the carrier (ST3) of the third planetary gearset (RS3) is coupled to the output shaft (14) to form the second shaft (II);
      the sun gear (SO1) of the first planetary gearset (RS1) is coupled to the sun gear (SO4) of the fourth planetary gearset (RS4) to form the third shaft (III);
      the ring gear (HO1) of the first planetary gearset (RS1) forms the fourth shaft (IV);
      the ring gear (HO2) of the second planetary gearset (RS2) is coupled to the sun gear (SO3) of the third planetary gearset (RS3) to form the fifth shaft (V);
      the carrier (ST1) of the first planetary gearset (RS1) is coupled to the ring gear (HO3) of the third planetary gearset (RS3) to form the sixth shaft (VI);
      the sun gear (SO2) of the second planetary gearset (RS2) is coupled to the ring gear (HO4) of the fourth planetary gearset (RS4) to form the seventh shaft (VII);
      the carrier (ST2) of the second planetary gearset (RS2) forms the eighth shaft (VIII);
      the first shifting element (A) is arranged between the third shaft (III) and a housing (GG) of the vehicle transmission (2);
      the second shifting element (B) is arranged between the fourth shaft (IV) and the housing (GG) of the vehicle transmission (2);
      the third shifting element (C) is arranged in a power flow direction between the fifth shaft (V) and the first shaft (I);
      the fourth shifting element (D) is arranged in the power flow direction between one of the eighth shaft (VIII) and the second shaft (II) and the eighth shaft (VIII) and the sixth shaft (VI); and
      the fifth shifting element (E) is arranged in the power flow direction between one of the seventh shaft (VII) and the fifth shaft (V), the seventh shaft (VII) and the eighth shaft (VIII), and the fifth shaft (V) and the eighth shaft (VIII).

2. The hybrid drive according to claim 1, wherein a gear ratio is arranged between the input shaft (3) of the vehicle transmission (2) and a pump shaft of the hydraulic pump (5).

3. The hybrid drive according to claim 1, wherein the vehicle transmission (2) has an additional electrically driven hydraulic pump (MSA).

4. The hybrid drive according to claim 1, wherein a torsional vibration damper is located between the internal combustion engine (1) and the vehicle transmission (3).

5. The hybrid drive according to claim 4, wherein the torsional vibration damper is connected to a crankshaft (6) of the internal combustion engine (1).

6. The hybrid drive according to claim 4, wherein the torsional vibration damper is a dual mass flywheel (9) which has a first mass is arranged between the internal combustion engine (1) and an output shaft (14) and is arranged transverse with respect to the input shaft (3) of the vehicle transmission (2), and a second mass of the dual mass flywheel (9) is arranged between the transverse output shaft (14) and the vehicle transmission (2).

7. The hybrid drive according to claim 1, wherein one of a clutch and a brake of an automatically shifting variable speed transmission, of planetary design and having at least 8 forward gears and at least one reverse gear, is provided as a second device (8).

8. The hybrid drive according to claim 7, wherein at least one of the first clutch device and the second clutch device is either normally engaged or normally disengaged.

9. The hybrid drive according to claim 1, wherein the first clutch device (7) is a starting clutch.

10. A hybrid drive for a vehicle with a power train, the hybrid drive comprising:
   an electric machine (4) permanently connected to an input shaft (3) of a vehicle transmission (2), between an internal combustion engine (1) and the vehicle transmission (2), the vehicle transmission (2) having a changeable gear ratio, and the electric machine being operable as one of a motor and a generator;

a hydraulic pump (5) for the vehicle transmission (2), the hydraulic pump (5) being connected to the input shaft (3) of the vehicle transmission (2) in a rotationally fixed manner;

at least one first shiftable clutch device (7);

a torsional vibration damper is located between the internal combustion engine (1) and the vehicle transmission (3); and an output shaft (14) is located transverse with respect to the input shaft (3) of the vehicle transmission (2) and is arranged between the torsional vibration damper and the internal combustion engine (1).

11. A hybrid drive for a vehicle with a power train, the hybrid drive comprising:

an electric machine (4) permanently connected to an input shaft (3) of a vehicle transmission (2), between an internal combustion engine (1) and the vehicle transmission (2), the vehicle transmission (2) having a changeable gear ratio, and the electric machine being operable as one of a motor and a generator;

a hydraulic pump (5) for the vehicle transmission (2), the hydraulic pump (5) being connected to the input shaft (3) of the vehicle transmission (2) in a rotationally fixed manner;

at least one first shiftable clutch device (7);

a torsional vibration damper is located between the internal combustion engine (1) and the vehicle transmission (3); and an output shaft (14) is located transverse with respect to the input shaft (3) of the vehicle transmission (2) and is arranged between the torsional vibration damper and the vehicle transmission (2).

* * * * *